United States Patent
Arangarasan et al.

(10) Patent No.: US 12,145,553 B2
(45) Date of Patent: Nov. 19, 2024

(54) SPRING BRAKE ACTUATOR FOR A VEHICLE, IN PARTICULAR PARKING OR EMERGENCY BRAKE ACTUATOR FOR USE IN A COMMERCIAL VEHICLE

(71) Applicant: WABCO INDIA LIMITED, Chennai (IN)

(72) Inventors: Senthil Kumar Arangarasan, Chennai (IN); Arun Sakthees Ramasamy, Chennai (IN); Aravindda Swamy Venkatesh, Chennai (IN)

(73) Assignee: ZF COMMERCIAL VEHICLE CONTROL SYSTEMS INDIA LIMITED, Tamil Nadu (IN)

( * ) Notice: Subject to any disclaimer, the term of this patent is extended or adjusted under 35 U.S.C. 154(b) by 477 days.

(21) Appl. No.: 17/598,136

(22) PCT Filed: Mar. 3, 2020

(86) PCT No.: PCT/IB2020/051778
§ 371 (c)(1),
(2) Date: Sep. 24, 2021

(87) PCT Pub. No.: WO2020/194078
PCT Pub. Date: Oct. 1, 2020

(65) Prior Publication Data
US 2022/0185258 A1 Jun. 16, 2022

(30) Foreign Application Priority Data
Mar. 27, 2019 (IN) .............................. 201941012082

(51) Int. Cl.
*B60T 17/08* (2006.01)
*F16D 121/10* (2012.01)
(Continued)

(52) U.S. Cl.
CPC .......... *B60T 17/086* (2013.01); *B60T 17/083* (2013.01); *F16D 2121/10* (2013.01);
(Continued)

(58) Field of Classification Search
CPC .... B60T 17/086; B60T 17/083; B60T 17/085; F16D 65/28; F16D 2121/08;
(Continued)

(56) References Cited

U.S. PATENT DOCUMENTS 3,926,094 A * 12/1975 Kurichh ................ B60T 17/083
188/170
5,345,858 A 9/1994 Pierce
(Continued)

FOREIGN PATENT DOCUMENTS

| EP | 2760720 A1 | 8/2014 |
|---|---|---|
| EP | 2944529 A1 | 11/2015 |
| WO | 0168429 A1 | 9/2001 |
| WO | 2017035115 A1 | 3/2017 |
| WO | 2017200550 A1 | 11/2017 |

*Primary Examiner* — Robert A. Siconolfi
*Assistant Examiner* — San M Aung
(74) *Attorney, Agent, or Firm* — Dickinson Wright PLLC

(57) ABSTRACT

A spring brake actuator (1) for a vehicle, in particular a parking or emergency brake actuator, for use in a commercial vehicle, includes a cylinder housing (2) having a cylinder housing base (5) and a spring seat (7) on the base, a spring brake piston (9) located in the cylinder housing (5) for applying a braking force, and a compression spring (11) arranged between the spring seat (7) and the spring brake piston (9). The cylinder housing (2) is divided into a spring chamber (12) and a pressure chamber (14), the compression spring (11) being arranged in the spring chamber (12) and the pressure chamber (14) being supplied with pressurized fluid. An elastically deformable diaphragm (16) is sealingly mounted to the cylinder housing (2), with an inner periphery
(Continued)

(18) sealingly mounted to the spring brake piston (9) to fluid-tightly isolate the pressure chamber (14) from the spring chamber (12).

20 Claims, 2 Drawing Sheets

(51) Int. Cl.
*F16D 125/08* (2012.01)
*F16D 125/12* (2012.01)
(52) U.S. Cl.
CPC ...... *F16D 2125/08* (2013.01); *F16D 2125/12* (2013.01); *F16D 2250/0084* (2013.01)
(58) Field of Classification Search
CPC ............. F16D 2121/10; F16D 2125/08; F16D 2125/12; F16D 2500/0084
USPC ........................................................ 188/167
See application file for complete search history.

(56) References Cited

U.S. PATENT DOCUMENTS

| | | |
|---|---|---|
| 5,623,862 A | 4/1997 | Hanaway et al. |
| 5,771,774 A * | 6/1998 | Stojic ................... B60T 17/085 29/888.06 |
| 6,164,187 A * | 12/2000 | Stojic ................... B60T 17/083 92/99 |
| 6,360,649 B1 * | 3/2002 | Plantan ................. B60T 17/085 92/99 |
| 6,588,314 B1 * | 7/2003 | Stojic ................... B60T 17/083 92/63 |
| 9,988,033 B2 | 6/2018 | Spath |
| 2007/0028761 A1 | 2/2007 | Schrader et al. |
| 2010/0095836 A1 * | 4/2010 | Fisher .................. B60T 17/083 92/48 |
| 2013/0239799 A1 * | 9/2013 | Bradford ............... B60T 17/083 92/63 |
| 2013/0292216 A1 * | 11/2013 | Bradford ................ F16D 65/28 188/106 F |
| 2014/0305300 A1 * | 10/2014 | Park ...................... B60T 17/083 92/63 |
| 2019/0176793 A1 * | 6/2019 | Koelzer ................. B60T 17/08 |

* cited by examiner

SPRING BRAKE ACTUATOR FOR A VEHICLE, IN PARTICULAR PARKING OR EMERGENCY BRAKE ACTUATOR FOR USE IN A COMMERCIAL VEHICLE

FIELD

The invention relates to a spring brake actuator for a vehicle, in particular parking or emergency brake actuator for use in a commercial vehicle.

BACKGROUND

Spring brake actuators of the aforementioned type and generally known in the art. For example, EP 2944529 A1 discloses an exemplary such spring brake actuator. While the spring brake actuators of the aforementioned type generally function in satisfactory manner, it has been observed that particular care needs to be taken when fitting the spring brake piston into the cylinder housing. The sealing in particular on the outer periphery of the spring brake piston in the prior art systems requires attention to the installation step and close tolerances, because the spring brake piston slides with sealing material along the cylinder housing wall. Due to the sliding movement of the sealing member, there was an inherent risk of pressure loss.

SUMMARY

The invention relates to a spring brake actuator for a vehicle, in particular a parking or emergency brake actuator for use in a commercial vehicle, the actuator including: a cylinder housing having a cylinder housing base and a spring seat on the base, a spring brake piston located in said cylinder housing for applying a braking force, a compression spring arranged between the spring seat and the spring brake piston, the compression spring being effective to push the spring brake piston away from the base, wherein the cylinder housing is divided into a spring chamber and a pressure chamber, the compression spring being arranged in the spring chamber and the pressure chamber being supplied with pressurized fluid.

In view of the above-mentioned deficiencies of the prior art, it was an object of the invention to improve the spring brake actuator of the initially mentioned type to overcome the deficiencies found in the prior art as much as possible. In particular, it was an object of the invention to provide an improved spring brake actuator which is less susceptible to pressure leakage, and easy to install and maintain.

The invention attains this object by disclosing a spring brake actuator of the initially mentioned type, wherein the cylinder housing comprises an elastically deformable diaphragm that comprises an annular flange which is sealingly mounted to the cylinder housing, and an inner periphery which is sealingly mounted to the spring brake piston such that the pressure chamber is fluid-tightly isolated from the spring chamber.

The invention is based upon the realization that optimal sealing can be achieved by preventing any relative movement between the sealing member and the cylinder housing.

Due to the large travel of the spring brake piston, it had previously been found to be unfeasible to install a diaphragm between the spring chamber and the pressure chamber. Surprisingly, it has however been found that the diaphragm is unproblematic to use in this arrangement, and it has also been found that it is surprisingly easy to sealingly mount the diaphragm also to the spring brake piston.

In a preferred embodiment, the cylinder housing comprises a first housing part and a second housing part mounted to the first housing part and the diaphragm is clamped between the first and second housing parts. Clamping in this context is to be understood as any way of mechanically fastening the diaphragm between the first and second housing parts under slight deformation of the diaphragm to achieve a fluid-tight seal between the first housing part and the diaphragm on one side, and the diaphragm and the second housing part on the other side. The clamping can be achieved by flanged connection, by crimping, or similar measures.

In a further preferred embodiment, the diaphragm is connected to the spring brake piston by at least one of:
press fitting,
threaded fastening,
material joining, in particular adhesive bonding, thermal bonding, or vulcanizing,
shrink fitting,
wobble riveting, or
a combination of several of the above.

In preferred embodiments, the spring brake piston comprises a piston tube that extends past the diaphragm and is configured to reciprocate between a recessed position and an extended position wherein in the extended position, the piston tube extends out of the first housing and preferably also partially out of the second housing part, to transmit the brake force.

Preferably, a release bolt, in particular a mechanical release bolt is mounted inside the cylinder housing, extending into the piston tube, and is effective to engage a stop shoulder provided on the spring brake piston upon rotation of the release bolt such as to move the piston tube against the force exerted by the compression spring.

Particularly preferred, the diaphragm is dimensioned such that the piston tube passes past the inner periphery of the diaphragm. The release bolt preferably is in threaded engagement with a static nut that is permanently mounted to the cylinder housing base. The presence of the static nut preferably ensures that the cylinder housing itself is always closed, thus no dust or other dirt can enter the cylinder housing. This is an improvement over prior art systems, which were outfitted with a removable stand-alone release bolt that was removed after use, where a separate dust plug always needed to be installed in the cylinder housing base to prevent dust from getting into the housing. The dust plug occasionally came loose or was omitted by maintenance personnel, leading to unwanted dirt accumulation inside the housing. In the present disclosure, by using a permanently installed release bolt and static nut assembly, this problem is solved.

In a further preferred embodiment, the diaphragm comprises an inner annular insert that is sealingly connected to the diaphragm by at least one of:
material joining, in particular adhesive bonding, thermal bonding or
vulcanization, or
threaded fastening.

The insert in turn is preferably sealingly connected to the spring brake piston by at least one of:
press fitting,
threaded fastening,
material joining, in particular adhesive bonding, thermal bonding, or vulcanizing,
shrink fitting,
wobble riveting, or
a combination of several of the above.

In a further preferred embodiment, the spring brake actuator comprises an internal breather valve fitted into the piston tube.

In further preferred embodiments, the spring brake actuator comprises a third housing part mounted to the second housing part opposite the first housing part, the third housing part containing a second diaphragm which defines a service brake chamber inside the third housing part, and a push rod located in the third housing part, wherein the spring brake piston, preferably through the piston tube, is effective to act upon the second diaphragm such as to transmit the brake force onto the push rod.

Preferably, the second diaphragm defines a working chamber between the diaphragm and the second housing part, wherein the spring brake chamber and the working chamber are in fluid communication through the internal breather valve and the piston tube.

For a more complete understanding of the invention, the invention will now be described in more detail with reference to the accompanying drawings. The detailed description will illustrate and describe or is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and disclaimed hereinafter. Further, the features described in the description, the drawings and the claims disclosing the invention may be essential for the invention considered alone or in combination. In particular, any reference signs in the claims shall not be construed as limiting the scope of the invention. The word "comprising" does not exclude other elements or steps. The wording "a" or "an" does not exclude a plurality.

BRIEF DESCRIPTION OF THE DRAWINGS

In brief, the figures to which reference will be made include.

DETAILED DESCRIPTION OF THE DRAWINGS

Figure 1:
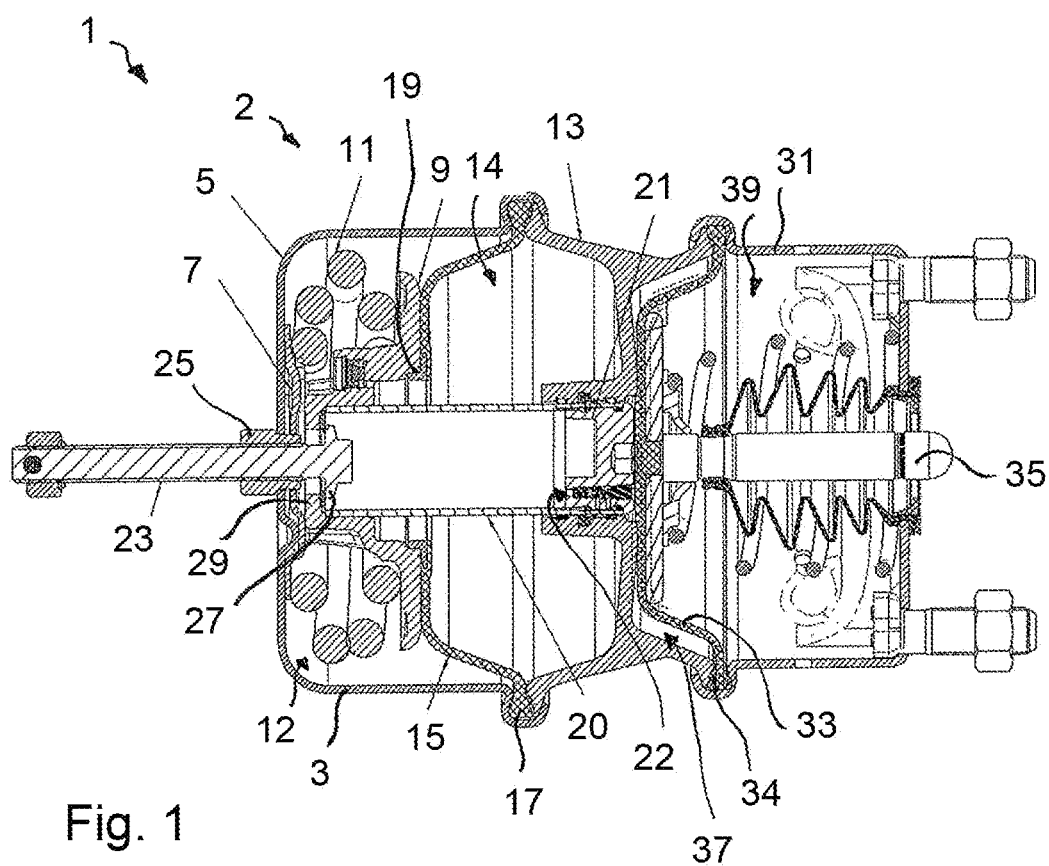
FIG. 1 illustrating a schematic cross sectional view of a spring brake actuator according to a preferred embodiment, and FIG. 2 illustrating a schematic three dimensional view of a diaphragm for use in the spring brake actuator of FIG. 1.

FIG. 1 shows a spring brake actuator 1 for use in a commercial vehicle. The spring brake actuator 1 comprises a cylinder housing 2 having a first housing part 3. The first housing part 3 comprises a cylinder housing base 5. On the cylinder housing base 5, a spring seat 7 is provided. Inside the cylinder housing 2, the spring brake actuator 1 comprises a spring brake piston 9 which is configured to reciprocate between a retention position (shown in FIG. 1) and a release position (not shown) which would be more to the right as compared to the state shown in FIG. 1.

In between the spring brake piston 9 and the cylinder housing base 5, a compression spring 11 is arranged engaging the spring seat 7. The compression spring 11 is biased against the spring brake piston 9 and effective to push the spring brake piston 9 away from the cylinder housing base 5.

The cylinder housing 2 comprises a second housing part 13 which preferably is a flange portion. The first housing part 3 is sealingly connected to the second housing part 13.

The sealing function is provided by a diaphragm 15 which is clamped in between the first housing part 3 and the second housing part 13 with an annular flange 17 provide on its outer periphery.

The diaphragm 15 is also sealingly connected to the spring brake piston 9 by an insert 19 positioned on an inner periphery 18 (FIG. 2) of the diaphragm 15. Accordingly, the diaphragm 15 compartmentalizes the volume defined by the first and second housing parts 3, 13 into a spring chamber 12 and a pressure chamber 14.

The spring brake piston 9 comprises a piston tube 20. An internal breather valve assembly 21 is fitted into the piston tube 20. The internal breather valve assembly 21 comprises an internal breather valve 22 which is configured to allow fluid transport into and out of the piston tube 20. Since the piston tube 20 is in fluid communication with the spring chamber 12, fluid transport is allowed to bypass the pressure chamber 14 through the piston tube 20 and the internal breather valve 22.

The spring brake actuator 1 comprises a release bolt 23 permanently installed on the cylinder housing 2 and in threaded engagement with a static nut 25 fastened to the cylinder housing base 5. The release bolt 23 comprises one or more engagement members 27 inside the piston tube 20 which are configured to engage a correspondingly positioned stop shoulder 29 on the spring brake piston 9. By rotating the release bolt, it is possible to manually move the spring brake piston 9 into the release position or back into the retention position, depending on the amount of rotation of the release bolt 23.

The spring brake actuator 1 further comprises a third housing part 31 which is sealingly connected to the second housing part 13. The spring brake actuator 1 further comprises a second diaphragm 33 which is sealingly connected, namely interposed, between the second housing part 13 and the third housing part 31 with an annular flange 34 provided on its outer periphery. The diaphragm 33 is in contact with a push rod 35. The push rod 35 is configured to reciprocate between a retained position (shown in FIG. 1) and an extended position (not shown in FIG. 1) in which the push rod 35 transmits the brake force coming from the spring brake piston 9 onto an external brake mechanism (not shown).

A working chamber 37 and a service brake chamber 39 are defined between the diaphragm 33 and the second housing part 13. The working chamber 37 is in fluid communication with the piston tube 20 through the internal breather valve assembly 21.

Figure 2:
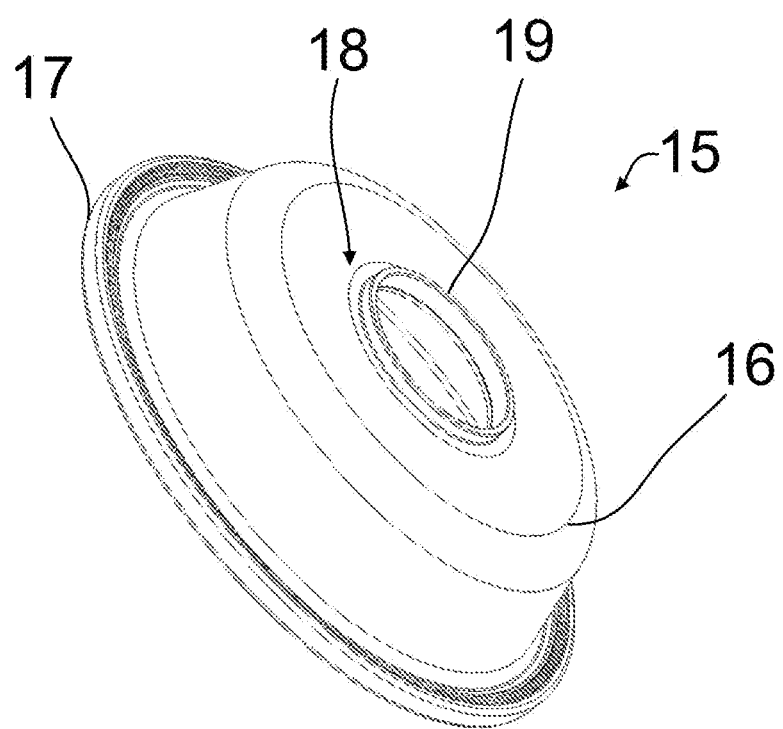

FIG. 2 provides a more detailed view of the diaphragm 15. The diaphragm 15 and the insert 19 found on the inner periphery 18 of the diaphragm 15 are preferably bonded by material joining. The diaphragm 15 preferably consists of the insert 19 and an elastically deformable base body 16 which is substantially cup-shaped and comprises the outer annular flange 17 for fastening the diaphragm sealingly to the cylinder housing 2.

As can be seen from the figures above, the invention suggests a simple yet very reliable manner of sealingly separating the pressure chamber 14 from the spring chamber 12 while at the same time maintaining ease of installation and keeping the number of parts involved under control. Risks of leakage are significantly reduced due to the prevention of relative movement between sealing parts and sealed surfaces.

It should of course be understood that various modifications and changes in form or detail could readily be made without departing from the scope of the invention. It is therefore intended that the invention may not be limited to the exact form and detail shown and described herein, nor to anything less than the whole of the invention disclosed herein and disclaimed hereinafter. Further, the features described in the description, the drawings and the claims disclosing the invention may be essential for the invention considered alone or in combination. In particular, any reference signs in the claims shall not be construed as limiting the scope of the invention. The word "comprising" does not exclude other elements or steps. The wording "a" or "an" does not exclude a plurality.

The invention claimed is:

1. A spring brake actuator (1) for a vehicle, the spring brake actuator (1) comprising:
    a cylinder housing (2) having a cylinder housing base (5) and a spring seat (7) disposed on the base,
    a spring brake piston (9) located in the cylinder housing (5) for applying a braking force,
    a compression spring (11) arranged between the spring seat (7) and the spring brake piston (9), the compression spring providing a spring bias to push the spring brake piston (9) away from the base (5) and the spring seat (7),
    wherein the cylinder housing (2) is divided into a spring chamber (12) and a pressure chamber (14), the compression spring (11) being arranged in the spring chamber (12) and the pressure chamber (14) being supplied with pressurized fluid,
    wherein the cylinder housing (2) includes an elastically deformable diaphragm (15) disposed within the cylinder housing, the diaphragm having an annular flange (17) which is sealingly mounted to the cylinder housing (2) and an inner periphery (18) which is sealingly mounted to the spring brake piston (9) such that the pressure chamber (14) is fluid-tightly isolated from the spring chamber (12);
    wherein the diaphragm (15) comprises an inner annular insert (19) that is sealingly connected to an elastically deformable base body (16) of the diaphragm (15) by at least one of:
        material joining, adhesive bonding, thermal bonding, or vulcanization, or threaded fastening.

2. The spring brake actuator (1) of claim 1, wherein the cylinder housing (2) comprises a first housing part (3) and a second housing part (13) mounted to the first housing part (3), and the diaphragm (15) is mechanically fastened between the first and second housing parts (3,13).

3. The spring brake actuator (1) of claim 1, wherein the diaphragm (15) is connected to the spring brake piston (9) by at least one of:
    press fitting,
    threaded fastening,
    material joining, i adhesive bonding, thermal bonding, or vulcanizing,
    shrink fitting,
    wobble riveting.

4. The spring brake actuator (1) of claim 1, wherein the spring brake piston (9) comprises a piston tube (20) that extends through the diaphragm (15) and is configured to reciprocate between a recessed position and an extended position, wherein in the extended position, the piston tube (20) extends out from the first housing part (3) to transmit brake force.

5. The spring brake actuator (1) of claim 4, wherein a release bolt (23) is mounted at least partially inside the cylinder housing (2), the release bolt (23) extending at least partially into the piston tube (20), and wherein the release bolt (23) comprises one or more engagement members (27) arranged inside the piston tube (2) the engagement members (27) configured to engage a stop shoulder (29) provided on the spring brake piston (9), wherein upon rotation of the release bolt (23) the piston tube (20) moves against the force exerted by the compression spring (11).

6. The spring brake actuator (1) of claim 5, wherein the release bolt (23) is in threaded engagement with a static nut (25) permanently mounted to the cylinder housing base (5).

7. The spring brake actuator (1) of claim 1,
    wherein the insert (19) is sealingly connected to the spring brake piston (9) by at least one of:
        press fitting,
        threaded fastening,
        material joining, adhesive bonding, thermal bonding, or vulcanizing,
        shrink fitting, or
        wobble riveting.

8. The spring brake actuator (1) of claim 4, further comprising an internal breather valve (22) fitted into the piston tube (20).

9. The spring brake actuator (1) of claim 8, further comprising:
    a third housing part (31) mounted to the second housing part (33) opposite the first housing part (3), the third housing part (31) containing a second diaphragm (33) which defines a service brake chamber (39) inside the third housing part (31), and
    a push rod (35) located in the third housing part (31),
    wherein the spring brake piston (9), is configured to act upon the second diaphragm (33) to transmit brake force onto the push rod (35).

10. The spring brake actuator (1) of claim 9, wherein the second diaphragm (33) defines a working chamber (37) between the second diaphragm (33) and the second housing part (13), wherein the spring brake chamber (12) and the working chamber (37) are in fluid communication through the internal breather valve (22) and the piston tube (20).

11. The spring brake actuator (1) of claim 6, wherein the static nut (25) closes the cylinder housing along with the release bolt (23) such that the cylinder housing (2) is always closed and dust or other dirt cannot enter the cylinder housing (2).

12. The spring brake actuator (1) of claim 6, wherein the release bolt (23) is axially coupled to the piston tube (20), wherein rotation of the release bolt (23) relative to the static nut (25) causes axial movement of the piston (20).

13. The spring brake actuator of claim 2, wherein the diaphragm (15) defines a fluid-tight seal between the first housing part (3) and the diaphragm (15) on one side and the second housing part (13) and the diaphragm (15) on the other side.

14. The spring brake actuator of claim 13, wherein the diaphragm (15) includes an annular flange (17) that is deformed between the first housing part (3) and the second housing part (13) to define the fluid-tight seal.

15. The spring brake of claim 1, wherein the diaphragm (15) includes an elastically deformable cup-shaped base body (16).

16. A spring brake actuator (1) for a vehicle, the spring brake actuator (1) comprising:
    a cylinder housing (2) having a cylinder housing base (5) and a spring seat (7) disposed on the base,
    a spring brake piston (9) located in the cylinder housing (5) for applying a braking force,
    a piston tube (20) mounted to the spring brake piston (9)

a compression spring (11) arranged between the spring seat (7) and the spring brake piston (9), the compression spring providing a spring bias to push the spring brake piston (9) away from the base (5) and the spring seat (7), wherein the cylinder housing (2) is divided into a spring chamber (12) and a pressure chamber (14), the compression spring (11) being arranged in the spring chamber (12) and the pressure chamber (14) being supplied with pressurized fluid, wherein the cylinder housing (2) includes an elastically deformable diaphragm (15) disposed within the cylinder housing, the diaphragm having an elastically deformable base body (16) with an annular flange (17) which is sealingly mounted to the cylinder housing (2) and an annular insert (19) separately formed from the base body and sealingly attached to the base body at an inner periphery (18) of the base body, wherein the annular insert (19) seals the base body (16) to the spring brake piston (9) such that the pressure chamber (14) is fluid-tightly isolated from the spring chamber (12).

17. The spring brake actuator of claim 16, wherein the diaphragm is radially spaced apart from the piston tube (20), and wherein the annular insert is radially spaced apart from the piston tube (20).

18. The spring brake actuator of claim 16, wherein the annular insert (19) and the spring brake piston (9) define a piston sealing interface therebetween, wherein the annular insert (19) and the spring brake piston (9) are fixed at the piston sealing interface and are free from relative movement at the piston sealing interface.

19. The spring brake actuator of claim 18, wherein the base body (16) and the annular insert (19) define a base body sealing interface therebetween and are fixed at the base body sealing interface and free from relative movement at the base body sealing interface.

20. The spring brake actuator (1) of claim 1,
wherein the spring brake piston (9) comprises a piston tube (20) that extends through the diaphragm (15) and the inner annular insert (19) and is configured to reciprocate between a recessed position and an extended position,
wherein the inner annular insert (19) is spaced away from the piston tube (20) and does not contact the piston tube (20).

* * * * *